United States Patent
Li et al.

(10) Patent No.: US 10,764,568 B2
(45) Date of Patent: Sep. 1, 2020

(54) 3D DISPLAY DEVICE, METHOD FOR CONTROLLING THE SAME AND COMPUTING DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xi Li, Beijing (CN); Hao Zhang, Beijing (CN); Lili Chen, Beijing (CN); Jinghua Miao, Beijing (CN); Jianwen Suo, Beijing (CN); Xuefeng Wang, Beijing (CN); Yukun Sun, Beijing (CN); Lixin Wang, Beijing (CN); Bin Zhao, Beijing (CN); Wenyu Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 39 days.

(21) Appl. No.: 16/201,189

(22) Filed: Nov. 27, 2018

(65) Prior Publication Data
US 2019/0306490 A1 Oct. 3, 2019

(30) Foreign Application Priority Data
Mar. 29, 2018 (CN) .......................... 2018 1 0270133

(51) Int. Cl.
*H04N 13/398* (2018.01)
*H04N 13/366* (2018.01)
(Continued)

(52) U.S. Cl.
CPC ....... *H04N 13/398* (2018.05); *G06K 9/00255* (2013.01); *H04N 7/0127* (2013.01);
(Continued)

(58) Field of Classification Search
CPC .. H04N 13/398; H04N 7/0127; H04N 13/366; H04N 13/31; H04N 13/315;
(Continued)

(56) References Cited

U.S. PATENT DOCUMENTS

2008/0252578 A1* 10/2008 Kim .................... H04N 13/359
345/87
2014/0063207 A1 3/2014 Li et al.
(Continued)

FOREIGN PATENT DOCUMENTS

CN 2911717 Y 6/2007
CN 101604511 A 12/2009
(Continued)

OTHER PUBLICATIONS

First Office Action for Chinese Application No. 201810270133.9, dated Apr. 17, 2019, 10 Pages.

*Primary Examiner* — Jeremiah C Hallenbeck-Huber
(74) *Attorney, Agent, or Firm* — Brooks Kushman P.C.

(57) ABSTRACT

The present disclosure provides a 3D display device, a method for controlling the same and a computing device. The method includes: collecting in real time current face image information of a viewer; based on the face image information, calculating at a second frame rate, target status information of the grating structure which enables the viewer to see a 3D image at a current viewpoint; adjusting a status of the grating structure at a third frame rate according to the target status information of the grating structure. The third frame rate is greater than the second frame rate.

15 Claims, 4 Drawing Sheets

(51) Int. Cl.
*H04N 13/31* (2018.01)
*G06K 9/00* (2006.01)
*H04N 7/01* (2006.01)
*H04N 13/315* (2018.01)

(52) U.S. Cl.
CPC ........... *H04N 13/31* (2018.05); *H04N 13/315* (2018.05); *H04N 13/366* (2018.05)

(58) Field of Classification Search
CPC ......... H04N 13/336; H04N 13/371–38; G06K 9/00255; G06K 9/00228; G06K 9/20; G06K 9/00221; G06K 9/00201
See application file for complete search history.

(56) References Cited

U.S. PATENT DOCUMENTS

| | | |
|---|---|---|
| 2014/0085182 A1 | 3/2014 | Lin et al. |
| 2016/0198150 A1* | 7/2016 | Meng .................... G02B 30/27 348/59 |
| 2017/0201743 A1 | 7/2017 | Lu et al. |
| 2017/0351908 A1* | 12/2017 | Wang ................. G06K 9/00255 |
| 2019/0037210 A1 | 1/2019 | Zhang et al. |

FOREIGN PATENT DOCUMENTS

| | | |
|---|---|---|
| CN | 102186094 A | 9/2011 |
| CN | 102243402 A | 11/2011 |
| CN | 102710956 A | 10/2012 |
| CN | 102798982 A | 11/2012 |
| CN | 103096107 A | 5/2013 |
| CN | 103984108 A | 8/2014 |
| CN | 104155824 A | 11/2014 |
| CN | 105445948 A | 3/2016 |
| CN | 105516704 A | 4/2016 |
| CN | 105791807 A | 7/2016 |
| CN | 105959674 A | 9/2016 |
| CN | 107396087 A | 11/2017 |

* cited by examiner

3D DISPLAY DEVICE, METHOD FOR CONTROLLING THE SAME AND COMPUTING DEVICE

CROSS-REFERENCE TO RELATED APPLICATION

This application claims priority to Chinese Patent Application No. 201810270133.9, filed on Mar. 29, 2018, which is incorporated herein by reference in its entirety.

TECHNICAL FIELD

The present disclosure relates to the field of naked-eye 3D display technologies, in particular to a 3D display device, a method for controlling the same and a computing device.

BACKGROUND

One naked-eye 3D display device is a display device that enables viewers to see 3D images without wearing an auxiliary tool. The principle of the naked-eye 3D display device is to place cylindrical lens or a parallax grating in front of a display panel of the display device to enable left and right eyes to see different displayed images, thereby producing 3D visual effects.

In one naked-eye 3D display device equipped with the parallax grating, multiple view focus points are provided and one viewer can see the best 3D picture effect when the viewer's viewpoint is at any one of the view focus points. Although visual effects of the naked-eye 3D display device may be improved in certain extent by setting multiple view focus points, the viewer cannot see good 3D display effect when the viewpoint of the viewer changes because a quantity of the view focus points is limited and positions of the view focus points are fixed.

SUMMARY

According to a first aspect, one embodiment of the present disclosure provides a method for controlling a 3D display device that includes a display panel and an adjustable grating structure. The method includes: collecting in real time current face image information of a viewer; based on the face image information, calculating at a second frame rate, target status information of the grating structure when the viewer is capable of seeing a 3D image at a current viewpoint; and adjusting a status of the grating structure at a third frame rate according to the target status information of the grating structure. The third frame rate is greater than the second frame rate.

Optionally, the collecting in real time current face image information of the viewer includes: collecting in real time, at a first frame rate, the current face image information of the viewer. The first frame rate is less than the second frame rate.

Optionally, the collecting in real time current face image information of the viewer includes: collecting a face image at a preset resolution; obtaining a first recognition result by performing face recognition for the collected face image; and obtaining the current face image information of the viewer according to the collected face image when the first recognition result indicates that the face of the viewer is recognized from the collected face image.

Optionally, the collecting in real time current face image information of the viewer further includes: reducing a frame rate at which the face image is collected, by performing delay operation, when the first recognition result indicates that the face of the viewer is not recognized from the collected face image.

Optionally, when the first recognition result indicates that the face of the viewer is not recognized from the collected face image, the method further includes: reducing the second frame rate and the third frame rate by performing delay operation.

Optionally, based on the face image information, calculating at the second frame rate, the target status information of the grating structure when the viewer is capable of seeing the 3D image at a current viewpoint, includes: establishing a coordinate system in a first extension direction perpendicular to a plane where the display panel is located and a second extension direction parallel to the plane where the display panel is located; calculating coordinates of the current viewpoint of the viewer at the second frame rate based on the face image information; and calculating the target status information of the grating structure when the viewer is capable of seeing the 3D image at the current viewpoint at the second frame rate based on the coordinates of the current viewpoint of the viewer.

Optionally, the calculating the target status information of the grating structure when the viewer is capable of seeing the 3D image at the current viewpoint at the second frame rate based on the coordinates of the current viewpoint of the viewer, includes: calculating a gating position of each grating unit of the grating structure at the second frame rate with a formula: $m=[(r-x)/k]\% \; n$ or $m=(x/k) \% \; n$; wherein $k=2 L/n$, m represents the grating position, r represents a resolution of a face image, x represents the coordinates of the current viewpoint, k represents a width of the grating element of the grating structure, n represents a quantity of grating elements of a grating unit in the grating structure, and L represents a monocular visual zone width of the viewer; and according to the grating position, searching for the target status information of the grating structure in a pre-created database that includes a plurality of pieces of target status information corresponding to a plurality of grating positions in a one-to-one manner.

Optionally, the adjusting the status of the grating structure at the third frame rate according to the target status information of the grating structure, includes: determining whether the target status information of the grating structure is identical to current status information of the grating structure, thereby obtaining a first determination result; when the first determination result indicates that the target status information is different from the current status information, adjusting the status of the grating structure at the third frame rate according to the target status information of the grating structure, thereby enabling the viewer to view the 3D display image at the current viewpoint.

Optionally, the grating structure includes a first electrode and a second electrode, the first electrode and the second electrode generate a driving electric field that drives grating units of the grating structure to switch between a light transmission state and an opaque state. The adjusting the status of the grating structure at the third frame rate according to the target status information of the grating structure, further includes: obtaining a maintenance time period in which the grating structure maintains the current status, when the first determination result indicates that the target status information is identical to the current status information; determining whether the maintenance time period is greater than a threshold value, thereby obtaining a second determination result; and exchanging a voltage signal applied to the first electrode and a voltage signal applied to the second electrode, when the second determination result indicates that the maintenance time period is greater than the threshold value.

According to a second aspect, one embodiment of the present disclosure provides a 3D display device that includes: a display panel; an adjustable grating structure; a collector configured to collect in real time current face image information of a viewer; a data processing circuit configured to, based on the face image information, calculate at a second frame rate, target status information of the grating structure when the viewer is capable of seeing a 3D image at a current viewpoint; and a grating adjuster configured to adjust a status of the grating structure at a third frame rate according to the target status information of the grating structure. The third frame rate is greater than the second frame rate.

Optionally, the collector is further configured to collect in real time, at a first frame rate, the current face image information of the viewer; and the first frame rate is less than the second frame rate.

Optionally, the collector includes: a collecting instrument configured to collect a face image at a preset resolution; a recognition circuit configured to perform face recognition for the collected face image to obtain a first recognition result; and an image information acquiring circuit configured to, when the first recognition result indicates that the face of the viewer is recognized from the collected face image, obtain the current face image information of the viewer according to the collected face image.

Optionally, the collector further includes: a delay circuit configured to, when the first recognition result indicates that the face of the viewer is not recognized from the collected face image, perform delay operation to reduce a frame rate at which the face image is collected.

Optionally, the delay circuit is further configured to, when the first recognition result indicates that the face of the viewer is not recognized from the collected face image, perform delay operation to reduce the second frame rate and the third frame rate.

Optionally, the data processing circuit includes: a first data processing sub-circuit configured to establish a coordinate system in a first extension direction perpendicular to a plane where the display panel is located and a second extension direction parallel to the plane where the display panel is located, and calculate coordinates of the current viewpoint of the viewer at the second frame rate based on the face image information; and a second data processing sub-circuit configured to calculate the target status information of the grating structure when the viewer is capable of seeing the 3D image at the current viewpoint at the second frame rate based on the coordinates of the current viewpoint of the viewer.

Optionally, the second data processing sub-circuit includes a grating position calculation sub-circuit and a search sub-circuit. The grating position calculation sub-circuit is configured to calculate at the second frame rate a gating position of each grating unit of the grating structure with a formula: m=[(r−x)/k]% n or m=(x/k) % n; wherein k=2 L/n, m represents the grating position, r represents a resolution of a face image, x represents the coordinates of the current viewpoint, k represents a width of the grating element of the grating structure, n represents a quantity of grating elements of a grating unit in the grating structure, and L represents a monocular visual zone width of the viewer. The search sub-circuit is configured to, according to the grating position, search for the target status information of the grating structure in a pre-created database that includes a plurality of pieces of target status information corresponding to a plurality of grating positions in a one-to-one manner.

Optionally, the grating adjuster includes a determination circuit and an adjustment circuit. The determination circuit is configured to determine whether the target status information of the grating structure is identical to current status information of the grating structure, thereby obtaining a first determination result. The adjustment circuit is configured to, when the first determination result indicates that the target status information is different from the current status information, adjust the status of the grating structure at the third frame rate according to the target status information of the grating structure, thereby enabling the viewer to view the 3D display image at the current viewpoint.

Optionally, the grating structure includes a first electrode and a second electrode, the first electrode and the second electrode generate a driving electric field that drives grating units of the grating structure to switch between a light transmission state and an opaque state. The grating adjuster further includes: a maintenance time period obtaining circuit configured to, when the first determination result indicates that the target status information is identical to the current status information, obtain a maintenance time period in which the grating structure maintains the current status. The determination circuit is further configured to determine whether the maintenance time period is greater than a threshold value, thereby obtaining a second determination result. The adjustment circuit is further configured to, when the second determination result indicates that the maintenance time period is greater than the threshold value, exchange a voltage signal applied to the first electrode and a voltage signal applied to the second electrode.

According to a third aspect, one embodiment of the present disclosure provides a computing device that includes: a processor, a memory and a computer program stored in the memory and executable by the processor. When the computer program is executed by the processor, the processor performs the above method.

According to a fourth aspect, one embodiment of the present disclosure provides a computer readable storage medium storing a computer program that is executable a processor to perform the above method.

BRIEF DESCRIPTION OF THE DRAWINGS

A brief introduction will be given hereinafter to the accompanying drawings which will be used in the description of the embodiments in order to explain the embodiments of the present disclosure more clearly. Apparently, the drawings in the description below are merely for illustrating some embodiments of the present disclosure. Those skilled in the art may obtain other drawings according to these drawings without paying any creative labor.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The following description of exemplary embodiments is merely used to illustrate the present disclosure and is not to be construed as limiting the present disclosure.

Figure 1:
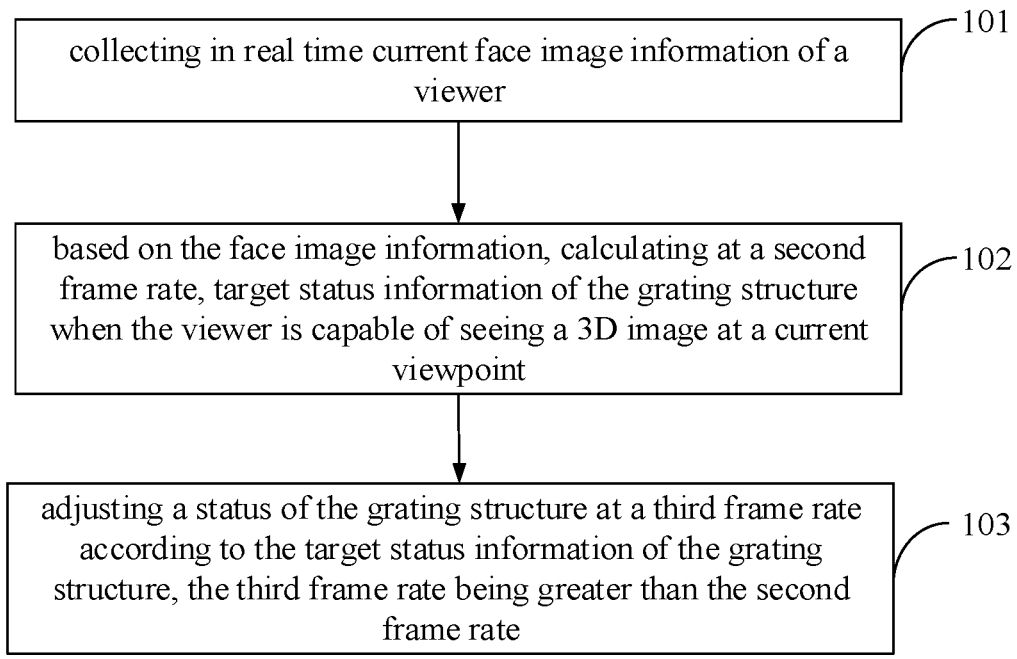
FIG. 1 is a flow chart of a method for controlling a 3D display device according to an embodiment of the present disclosure.

Referring to FIG. 1, one embodiment of the present disclosure provides a method for controlling a 3D display device. This method is applied to the 3D display device that includes a display panel and an adjustable grating structure. The method includes the following steps.

At step 101, current face image information of a viewer is collected in real time.

Specifically, the collected face image information includes a face image of the viewer in front of the 3D display device. The face image may be used to obtain a current distance between the viewer and the 3D display device as well as a current viewing angle of the viewer.

At step 102, target status information of the grating structure when the viewer can see a 3D image at a current viewpoint is calculated at a second frame rate based on the face image information.

Specific structures of the grating structure may be in a variety of forms. For example, the grating structure includes a plurality of grating units. Each grating unit includes a plurality of grating elements. Each grating element is capable of switching between a light transmission state and an opaque state. When the grating structure adopts the above structures, along the grating units of the grating structure, a quantity of the grating elements in each of the grating units is identical. By applying a driving electric field to each grating element, the grating element is controlled to be deflected, thereby controlling the grating element to switch between the light transmission state and the opaque state. In some embodiments, specific structures of the grating structure may be the same or similar to structures of a grating structure disclosed in U.S. Pub. No. 20170201743A1, which is incorporated herein by reference in its entirety.

Specifically, after the face image information is collected, a position of the viewer at the current viewpoint is obtained according to the face image information; and then, the target status information of the grating structure when the viewer can see the 3D image at the current viewpoint is calculated at the second frame rate based on the position of the viewer at the current viewpoint. The target status information indicates that each grating element of each grating unit is in the light transmission state or the opaque state. In addition, the above second frame rate may be set according to actual needs, such as 90 Hz, which is not limited to this.

At step 103, a status of the grating structure is adjusted at a third frame rate according to the target status information of the grating structure, where the third frame rate is greater than the second frame rate.

Specifically, based on the target status information obtained in the above step 102, the status of the grating structure is adjusted so that the status of the grating structure matches the current viewpoint of the viewer, thereby enabling the viewer to view good 3D display effect at the current viewpoint.

In addition, by setting the third frame rate being greater than the second frame rate, a rate at which the status of the grating structure is adjusted according to the target status information of the grating structure is greater than a rate at which the target status information of the grating structure is calculated. Thus, when the current viewpoint of the viewer is changed, the grating structure can respond quickly to ensure a better real-time performance. In one embodiment, the above third frame rate may be 250 Hz, which is not limited to this.

In one embodiment, the above steps 101 and 102 may be implemented in the same thread, while the above step 103 may be implemented in another thread.

As can be seen from the specific control process of the above method, in the method of one embodiment of the present disclosure, the current face image information of the viewer is collected in real time, then the target status information of the grating structure when the viewer can see the 3D image at the current viewpoint is calculated at the second frame rate, and then the status of the grating structure is adjusted at the third frame rate according to the target status information of the grating structure, so that the grating structure of the 3D display device matches the current viewpoint of the viewer, thereby enabling the viewer to view a good 3D image displayed by the 3D display device at the current viewpoint. Therefore, the method of one embodiment of the present disclosure can adjust in real time the grating structure of the 3D display device according to the current viewpoint of the viewer, thereby enabling the viewer to view good 3D display effect no matter how the viewer's viewpoint changes.

In addition, in the method of one embodiment of the present disclosure, by setting the third frame rate being greater than the second frame rate, the rate at which the status of the grating structure is adjusted according to the target status information is greater than the rate at which the status of the grating structure is calculated. Thus, when the current viewpoint of the viewer is changed, the grating structure can respond quickly to ensure a better real-time performance when the current viewpoint of the viewer is changed. Moreover, the method of one embodiment of the present disclosure is simple in operation with low cost, may be flexibly applied to devices with 3D display function and have strong portability. For example, the method of one embodiment of the present disclosure may be applied to development of other Android applications, specifically for the development of players or image browsers and other applications.

Optionally, in the above step 101, collecting in real time the current face image information of the viewer specifically includes: collecting in real time, at a first frame rate, the current face image information of the viewer, where the first frame rate is less than the second frame rate.

Specifically, the above first frame rate may be set according to actual needs, such as 30 Hz. The current face image information of the viewer is collected in real time at the first frame rate which is less than the second frame rate, thus the rate at which the target status information is calculated is greater than a rate at which the face image information is collected. In this way, the 3D display device can quickly calculate the target status information of the grating structure according to changes of the viewpoint of the viewer, and then makes a better adjustment to the status of the grating structure according to the obtained target status information. This further ensures real-time adjustment of the status of the grating element.

Figure 2:
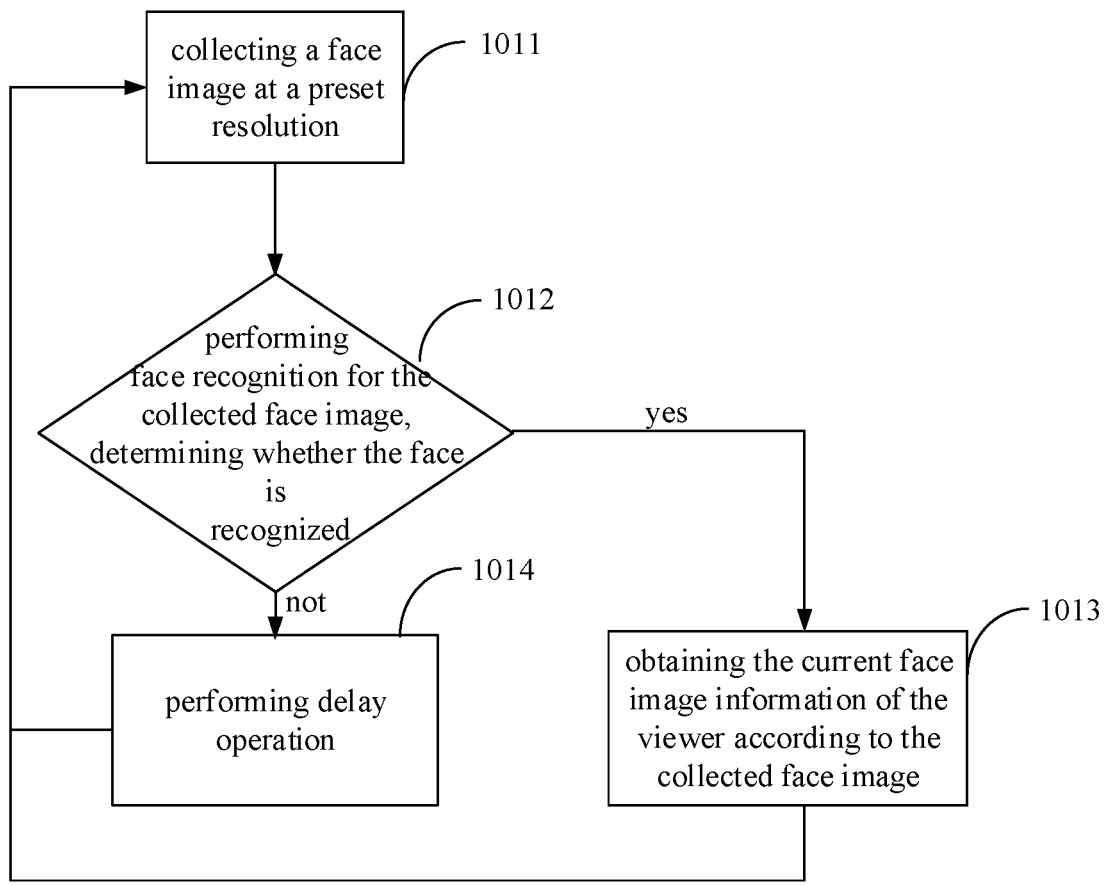
FIG. 2 is a flow chart of a process of collecting current face image information of a viewer in real time according to an embodiment of the present disclosure.

Optionally, as shown in FIG. 2, in the above step 101, collecting in real time the current face image information of the viewer specifically includes the following steps.

At step 1011, a face image is collected at a preset resolution.

Specifically, the resolution for one to-be-collected face image may be preset according to actual needs, and then the face image is collected at the preset resolution.

At step 1012, face recognition is performed for the collected face image to obtain a first recognition result.

Specifically, when the viewer is watching 3D display, the viewer may be left. When the viewer is left, there is no need to continue collecting face images at the original frame rate, otherwise it is easy to waste resources. Thus, after the face image is collected at the preset resolution, the face recognition is performed for the collected face image to obtain the first recognition result. The first recognition result includes a first situation and a second situation. In the first situation, the first recognition result indicates that the face of the viewer is recognized from the collected face image. In the second situation, the first recognition result indicates that the face of the viewer is not recognized from the collected face image. In one embodiment, the above face recognition performed for the collected face image may be implemented through by open source algorithms, such as OpenCV algorithm, which is not limited to this.

At step 1013, when the first recognition result indicates that the face of the viewer is recognized from the collected face image, the current face image information of the viewer is obtained according to the collected face image.

Specifically, when the first recognition result indicates that the face of the viewer is recognized from the collected face image, the current face image information of the viewer is obtained according to the collected face image, and the face image information can be applied in the subsequent step of calculating the target status information.

Optionally, in the above step 101, collecting in real time the current face image information of the viewer specifically includes: at step 1014, when the first recognition result indicates that the face of the viewer is not recognized from the collected face image, delay operation is performed to reduce the frame rate at which the face images are collected.

Specifically, when the first recognition result indicates that the face of the viewer is not recognized from the collected face image, it means that the viewer is not watching the 3D display device in front of the 3D display device. At this point, the delay operation is performed to extend a time interval for collecting face images, thereby reducing the frame rate at which the face images are collected and then further avoiding waste of resources. In one embodiment, the extended time interval may be set according to actual needs, such as 10 ms, which is not limited to this. Therefore, the above method can collect face images at a low frame rate when not recognizing the face of the viewer, thereby saving system overhead; and the above method can subsequently adjust the status of the grating element at a high frame rate after the face of the viewer is recognized, thereby ensuring that the best 3D display effect is presented to the viewer.

Optionally, when the first recognition result indicates that the face of the viewer is not recognized from the collected face image, the above method further includes: performing delay operation to reduce the second frame rate and the third frame rate.

Specifically, when the first recognition result indicates that the face of the viewer is not recognized from the collected face image, it means that the viewer is not watching the 3D display device in front of the 3D display device. At this point, the delay operation is performed to reduce the second frame rate and the third frame rate so that both of the rate at which the target status information of the grating structure is calculated and the rate at which the status of the grating structure is adjusted can be reduced, thereby further saving resource.

Figure 3:
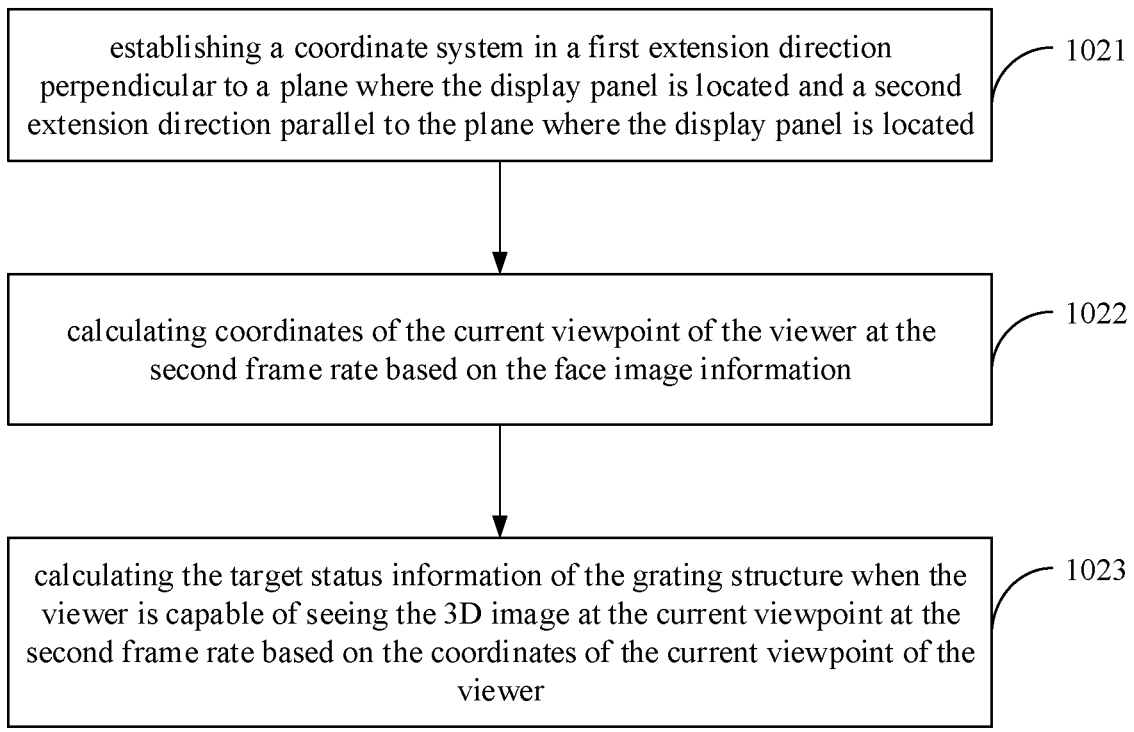
FIG. 3 is a flow chart of a process of calculating target status information of a grating structure according to an embodiment of the present disclosure.

Optionally, as shown in FIG. 3, in the above step 102, the step of calculating the target status information of the grating structure when the viewer can see the 3D image at the current viewpoint at the second frame rate based on the face image information includes the following steps.

At step 1021, a coordinate system is established in a first extension direction perpendicular to a plane where the display panel is located and a second extension direction parallel to the plane where the display panel is located.

Specifically, after the coordinate system is established in the first extension direction perpendicular to the plane where the display panel is located and the second extension direction parallel to the plane where the display panel is located, an origin of the coordinate system may be set according to actual needs, for example, taking a corner of the 3D display device as the origin.

At step 1022, coordinates of the current viewpoint of the viewer are calculated at the second frame rate based on the face image information.

Specifically, the position of the viewer at the current viewpoint is determined based on the face image information, and then the coordinates of the current viewpoint of the viewer are obtained through calculation.

At step 1023, the target status information of the grating structure when the viewer can see the 3D image at the current viewpoint is calculated at the second frame rate based on the coordinates of the current viewpoint of the viewer.

Specifically, the above step 1023 may include the following steps.

At step 10231, a gating position of each grating unit of the grating structure is calculated at the second frame rate with the following formula:

$$m=[(r-x)/k]\% \; n \; \text{or} \; m=(x/k)\% \; n;$$

where k=2 L/n, m represents the grating position, r represents the resolution of the face image, x represents the coordinates of the current viewpoint, k represents a width of the grating element of the grating structure, n represents a quantity of grating elements of the grating unit in the grating structure, and L represents a monocular visual zone width of the viewer.

Specifically, when collecting the face image of the viewer, a rear camera or a front camera disposed at the 3D display device may be used to collect the face image of the viewer. The rear camera or the front camera may be equipped with the 3D display device. When the face image of the viewer is collected by the rear camera, the above grating position is expressed as $m=[(r-x)/k]\% \; n$. When the face image of the viewer is collected by the front camera, the above grating position is expressed as $m=(x/k) \% \; n$. In the above formulas for calculating the grating position m, "%" represents taking remainders and the above viewpoint coordinate x may be a horizontal coordinate of the viewpoint.

At step 10232, according to the grating position, the target status information of the grating structure is searched in a pre-created database that includes a plurality of pieces of target status information corresponding to a plurality of grating positions in a one-to-one manner.

Specifically, the database that includes a plurality of pieces of target status information corresponding to a plurality of grating positions in a one-to-one manner, may be pre-created, then, when the grating position is known, the target status information of the grating structure corresponding to the known grating position can be obtained by searching for the known grating position in the database. For an instance, the grating structure includes a plurality of grating units and each grating unit includes a plurality of grating elements, for example, when a quantity n of the grating elements in the grating unit is 16 and when the grating position is calculated as 16, by searching for the grating position which is equal to 8 in the database, it is obtained that a first grating element to an eighth grating element in each grating unit are controlled to be in the light transmission state while other grating elements are in the opaque state.

Figure 4:
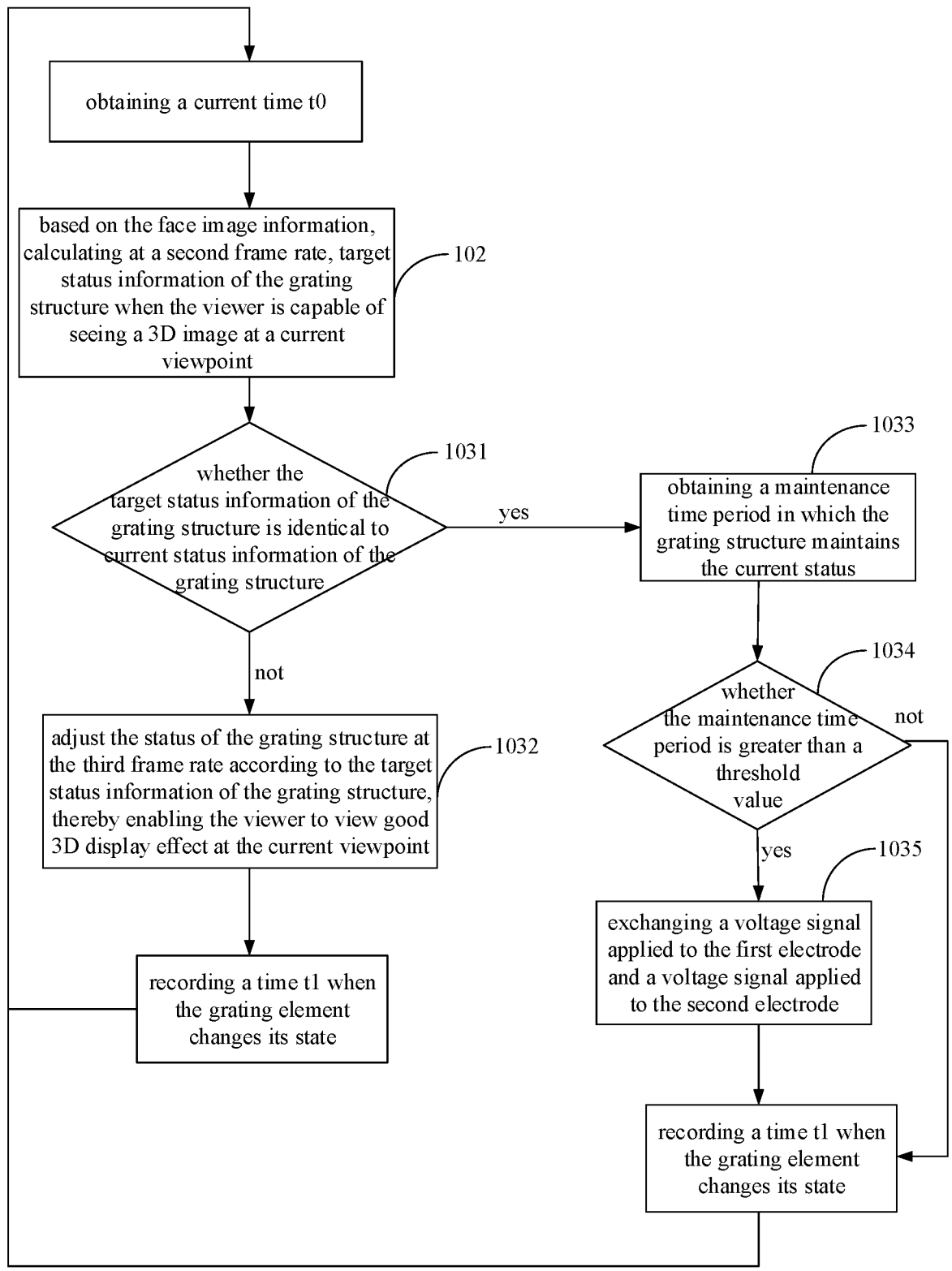
FIG. 4 is a flow chart of a process of adjusting status of the grating structure based on the target status information according to an embodiment of the present disclosure.

Optionally, as shown in FIG. 4, in the above step 103, adjusting the status of the grating structure at the third frame rate according to the target status information of the grating structure, includes the following steps.

At step 1031, whether the target status information of the grating structure is identical to current status information of the grating structure is determined, thereby obtaining a first determination result.

Specifically, when the viewer does not move or moves in a small range in front of the 3D display device, the target status information corresponding to the viewpoint of the viewer may be not changed, then at this point, it is not necessary to adjust the status of the grating structure. Thus, when adjusting the status of the grating element according to the target status information, whether the target status information of the grating structure is identical to the current status information of the grating structure may be first determined, and then corresponding operation may be performed according to the first determination result, thereby avoiding waste of resource.

At step 1032, when the first determination result indicates that the target status information is different from the current status information, the status of the grating structure is adjusted at the third frame rate according to the target status information of the grating structure, thereby enabling the viewer to view good 3D display effect at the current viewpoint.

Specifically, when the first determination result indicates that the target status information is different from the current status information, it means that the grating structure in the current status cannot enable the viewer to view good 3D display effect at the current viewpoint, thus it is necessary to adjust the status of the grating structure according to the target status information of the grating structure, thereby enabling the grating structure to be in the target status and then ensuring that the viewer can view good 3D display effect at the current viewpoint.

Optionally, the above grating structure may include a first electrode and a second electrode. The first electrode and the second electrode generate a driving electric field that can drive the grating units of the grating structure to switch between the light transmission state and the opaque state.

In the above step 103, adjusting the status of the grating structure at the third frame rate according to the target status information of the grating structure, further includes the following steps.

At step 1033, when the first determination result indicates that the target status information is identical to the current status information, a maintenance time period in which the grating structure maintains the current status is obtained.

Specifically, when the first determination result indicates that the target status information is identical to the current status information, it means that the grating structure in the current status can enable the viewer to view good 3D display effect at the current viewpoint, thus there is no need to adjust the status of the grating structure. However, considering that polarization phenomenon easily occurs when the grating element is in a state for a long time period, when the first determination result indicates that the target status information is identical to the current status information, the maintenance time period in which the grating structure maintains the current status is obtained, and judgement is performed for the maintenance time period to determine whether it is necessary to adjust the status of the grating structure.

More specifically, obtaining the maintenance time period in which the grating structure maintains the current status includes: recording a time t1 when the grating element changes its state for the last time, obtaining a current time t0, and calculating a difference between t1 and t0, thereby obtaining the maintenance time period in which the grating structure maintains the current status.

At step 1034, whether the maintenance time period is greater than a threshold value is determined, thereby obtaining a second determination result.

At step 1035, when the second determination result indicates that the maintenance time period is greater than the threshold value, a voltage signal applied to the first electrode and a voltage signal applied to the second electrode are exchanged.

Specifically, the above threshold value may be set according to actual needs, the above second determination result includes two situations. When the second determination result indicates that the maintenance time period is greater than the threshold value, it means that the grating element is in a state for a long time, at this point, the voltage signal applied to the first electrode and the voltage signal applied to the second electrode are exchanged while the grating structure is still in the current status, thereby enabling the viewer to view good 3D display effect at the current viewpoint while preventing polarization of the grating elements, and then enabling the 3D display device to have better stability.

It should be noted that when the thread is running too fast and the frequency is too high, it will result in waste of resources. Thus, after each execution of the step of recording the time t1 when the grating element changes its state as shown in FIG. 4, the delay operation may be performed to reduce the third frame rate. The specific time period of the delay operation may be set according to actual needs, such as 1 ms.

One embodiment of the present disclosure further provides a 3D display device. The above method may be applied to the 3D display device. The 3D display device includes a display panel and an adjustable grating structure. The 3D display device further includes: a collector configured to collect in real time current face image information of a viewer; a data processing circuit configured to, based on the face image information, calculate at a second frame rate, target status information of the grating structure when the viewer can see a 3D image at a current viewpoint; and a grating adjuster configured to adjust a status of the grating structure at a third frame rate according to the target status information of the grating structure, where the third frame rate is greater than the second frame rate.

Specifically, specific structures of the grating structure may be in a variety of forms. For example, the grating structure includes a plurality of grating units. Each grating unit includes a plurality of grating elements. Each grating element is capable of switching between a light transmission state and an opaque state. When the grating structure adopts the above structures, along the grating units of the grating structure, a quantity of the grating elements in each of the grating units is identical. By applying a driving electric field to each grating element, the grating element is controlled to be deflected, thereby controlling the grating element to switch between the light transmission state and the opaque state.

The above data processing circuit may obtain a position of the viewer at the current viewpoint according to the face image information, and then calculate at the second frame rate the target status information of the grating structure when the viewer can see the 3D image at the current viewpoint based on the position of the viewer at the current viewpoint. The target status information indicates that each grating element of each grating unit is in the light transmission state or the opaque state. In addition, the above second frame rate may be set according to actual needs, such as 90 Hz, which is not limited to this The above grating adjuster adjusts the status of the grating structure based on the target status information obtained by the data processing circuit, so that the status of the grating structure matches the current viewpoint of the viewer, thereby enabling the viewer to view good 3D display effect at the current viewpoint.

In addition, by setting the third frame rate being greater than the second frame rate, a rate at which the status of the grating structure is adjusted according to the target status information of the grating structure is greater than a rate at which the target status information of the grating structure is calculated. Thus, when the current viewpoint of the viewer is changed, the grating structure can respond quickly to ensure a better real-time performance. In one embodiment, the above third frame rate may be 250 Hz, which is not limited to this.

In the 3D display device of one embodiment of the present disclosure, the collector can collect in real time the current face image information of the viewer; the data processing circuit can calculate at the second frame rate the target status information of the grating structure when the viewer can see the 3D image at the current viewpoint according to the face image information; then, the grating adjuster can adjust the status of the grating structure at the third frame rate according to the target status information of the grating structure, so that the grating structure of the 3D display device matches the current viewpoint of the viewer, thereby enabling the viewer to view a good 3D image displayed by the 3D display device at the current viewpoint. Therefore, the 3D display device of one embodiment of the present disclosure can adjust in real time the grating structure of the 3D display device according to the current viewpoint of the viewer, thereby enabling the viewer to view good 3D display effect no matter how the viewer's viewpoint changes.

In addition, in the 3D display device of one embodiment of the present disclosure, by setting the third frame rate being greater than the second frame rate, the rate at which the grating adjuster adjusts the status of the grating structure according to the target status information is greater than the rate at which the data processing circuit calculates the status of the grating structure. Thus, when the current viewpoint of the viewer is changed, the grating structure can respond quickly to ensure a better real-time performance when the current viewpoint of the viewer is changed.

Optionally, the above collector is further configured to collect in real time, at a first frame rate, the current face image information of the viewer, where the first frame rate is less than the second frame rate.

Specifically, the above first frame rate may be set according to actual needs, such as 30 Hz. The current face image information of the viewer is collected in real time at the first frame rate which is less than the second frame rate, thus the rate at which the target status information is calculated is greater than a rate at which the face image information is collected. In this way, the data processing circuit of the 3D display device can quickly calculate the target status information of the grating structure according to changes of the viewpoint of the viewer, and then makes a better adjustment to the status of the grating structure according to the obtained target status information. This further ensures real-time adjustment of the status of the grating element.

Optionally, the above collector includes: a collecting instrument configured to collect a face image at a preset resolution; a recognition circuit configured to perform face recognition for the collected face image to obtain a first recognition result; and an image information acquiring circuit configured to, when the first recognition result indicates that the face of the viewer is recognized from the collected face image, obtain the current face image information of the viewer according to the collected face image.

Figure 5:
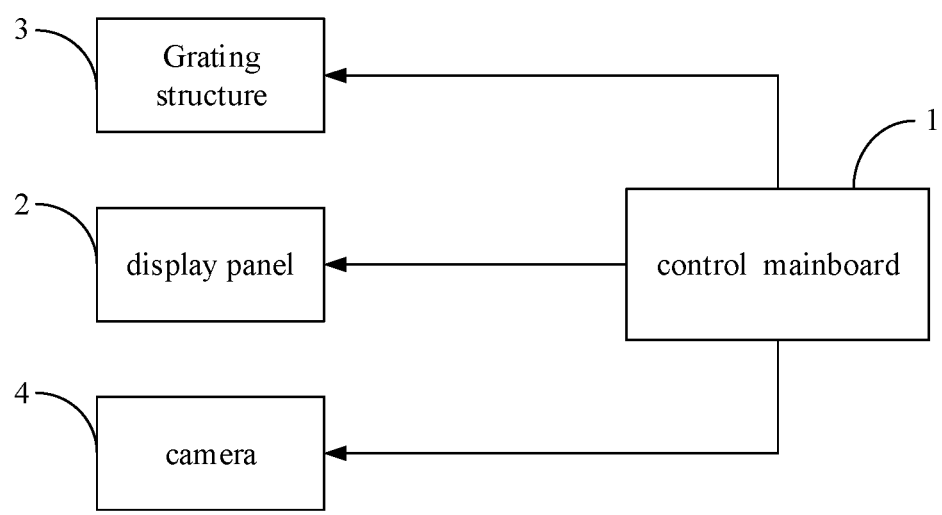
FIG. 5 is a schematic view of a 3D display device according to an embodiment of the present disclosure.

Specifically, as shown in FIG. 5, the collecting instrument may be a camera 4 disposed on the 3D display device. The camera 4 may be coupled to a control mainboard 1 of the 3D display device through a flexible printed circuit board (FPC). The control mainboard 1 controls on and off of the camera 4, there controlling the camera 4 to collect images. A position of the above camera 4 may be set according to actual needs. For example, the above camera 4 may be disposed at a top portion of the display panel of the 3D display device in a manner similar to that of a tablet device, or, the above camera 4 may be disposed at a left position of the display panel in a manner similar to that of a mobile phone. In addition, the resolution for one to-be-collected face image may be preset according to actual needs, and then the collecting instrument collects the face image at the preset resolution.

When the viewer is watching 3D display, the viewer may be left. When the viewer is left, there is no need to continue collecting face images at the original frame rate, otherwise it is easy to waste resources. Thus, after the face image is collected at the preset resolution, the recognition circuit performs the face recognition for the collected face image to obtain the first recognition result. The first recognition result includes a first situation and a second situation. In the first situation, the first recognition result indicates that the face of the viewer is recognized from the collected face image. In the second situation, the first recognition result indicates that the face of the viewer is not recognized from the collected face image. In one embodiment, the above face recognition performed for the collected face image may be implemented through by open source algorithms, such as OpenCV algorithm, which is not limited to this.

When the first recognition result indicates that the face of the viewer is recognized from the collected face image, the image information acquiring circuit is configured to obtain the current face image information of the viewer according to the collected face image. The face image information can be applied in the subsequent step of calculating the target status information.

Optionally, the above collector further includes: a delay circuit configured to, when the first recognition result indicates that the face of the viewer is not recognized from the collected face image, perform delay operation to reduce the frame rate at which the face images are collected.

Specifically, when the first recognition result indicates that the face of the viewer is not recognized from the collected face image, it means that the viewer is not watching the 3D display device in front of the 3D display device. At this point, the delay operation is performed by the delay circuit to extend a time interval for collecting face images, thereby reducing the frame rate at which the face images are collected and then further avoiding waste of resources. In one embodiment, the extended time interval may be set according to actual needs, such as 10 ms, which is not limited to this. Therefore, the above 3D display device can collect face images at a low frame rate when not recognizing the face of the viewer, thereby saving system overhead; and the above 3D display device can subsequently adjust the status of the grating element at a high frame rate after the face of the viewer is recognized, thereby ensuring that the best 3D display effect is presented to the viewer.

Optionally, the above delay circuit is further configured to, when the first recognition result indicates that the face of the viewer is not recognized from the collected face image, perform delay operation to reduce the second frame rate and the third frame rate.

Specifically, when the first recognition result indicates that the face of the viewer is not recognized from the collected face image, it means that the viewer is not watching the 3D display device in front of the 3D display device. At this point, the delay operation is performed to reduce the second frame rate and the third frame rate so that both of the rate at which the target status information of the grating structure is calculated and the rate at which the status of the grating structure is adjusted can be reduced, thereby further saving resource.

Optionally, the above data processing circuit includes: a first data processing sub-circuit configured to establish a coordinate system in a first extension direction perpendicular to a plane where the display panel is located and a second extension direction parallel to the plane where the display panel is located, and calculate coordinates of the current viewpoint of the viewer at the second frame rate based on the face image information; and a second data processing sub-circuit configured to calculate the target status information of the grating structure when the viewer can see the 3D image at the current viewpoint at the second frame rate based on the coordinates of the current viewpoint of the viewer.

Specifically, after the coordinate system is established in the first extension direction perpendicular to the plane where the display panel is located and the second extension direction parallel to the plane where the display panel is located, an origin of the coordinate system may be set according to actual needs, for example, taking a corner of the 3D display device as the origin. The position of the viewer at the current viewpoint and an angle of the current viewpoint with respect to a center point of the 3D display device are determined based on the face image information, and then the coordinates of the current viewpoint of the viewer are obtained through calculation.

Optionally, the above second data processing sub-circuit includes a grating position calculation sub-circuit and a search sub-circuit.

The grating position calculation sub-circuit is configured to calculate at the second frame rate a gating position of each grating unit of the grating structure with the following formula: $m=[(r-x)/k]\% n$ or $m=(x/k) \% n$; where $k=2$ $L/n$, $m$ represents the grating position, $r$ represents the resolution of the face image, $x$ represents the coordinates of the current viewpoint, $k$ represents a width of the grating element of the grating structure, $n$ represents a quantity of grating elements of the grating unit in the grating structure, and $L$ represents a monocular visual zone width of the viewer.

The search sub-circuit is configured to, according to the grating position, search for the target status information of the grating structure in a pre-created database that includes a plurality of pieces of target status information corresponding to a plurality of grating positions in a one-to-one manner.

Specifically, when collecting the face image of the viewer, a rear camera or a front camera disposed at the 3D display device may be used to collect the face image of the viewer. When the face image of the viewer is collected by the rear camera, the above grating position is expressed as $m=[(r-x)/k]\% n$. When the face image of the viewer is collected by the front camera, the above grating position is expressed as $m=(x/k) \% n$.

In addition, the database that includes a plurality of pieces of target status information corresponding to a plurality of grating positions in a one-to-one manner, may be pre-created, then, when the grating position is known, the target status information of the grating structure corresponding to the known grating position can be obtained by searching for the known grating position in the database.

Optionally, the above grating adjuster further includes a determination circuit and an adjustment circuit.

The determination circuit is configured to determine whether the target status information of the grating structure is identical to current status information of the grating structure, thereby obtaining a first determination result.

The adjustment circuit is configured to, when the first determination result indicates that the target status information is different from the current status information, adjust the status of the grating structure at the third frame rate according to the target status information of the grating structure, thereby enabling the viewer to view good 3D display effect at the current viewpoint.

Specifically, when the viewer does not move or moves in a small range in front of the 3D display device, the target status information corresponding to the viewpoint of the viewer may be not changed, then at this point, it is not necessary to adjust the status of the grating structure. Thus, when adjusting the status of the grating element according to the target status information, whether the target status information of the grating structure is identical to the current status information of the grating structure may be first determined, and then corresponding operation may be performed according to the first determination result, thereby avoiding waste of resource.

When the first determination result indicates that the target status information is different from the current status information, it means that the grating structure in the current status cannot enable the viewer to view good 3D display effect at the current viewpoint, thus it is necessary to adjust the status of the grating structure according to the target status information of the grating structure, thereby enabling the grating structure to be in the target status and then ensuring that the viewer can view good 3D display effect at the current viewpoint.

Optionally, the above grating structure may include a first electrode and a second electrode. The first electrode and the second electrode generate a driving electric field that can drive the grating units of the grating structure to switch between the light transmission state and the opaque state.

The above grating adjuster may further include a maintenance time period obtaining circuit that is configured to, when the first determination result indicates that the target status information is identical to the current status information, obtain a maintenance time period in which the grating structure maintains the current status. The determination circuit is further configured to determine whether the maintenance time period is greater than a threshold value, thereby obtaining a second determination result. The adjustment circuit is further configured to, when the second determination result indicates that the maintenance time period is greater than the threshold value, exchange a voltage signal applied to the first electrode and a voltage signal applied to the second electrode.

Specifically, when the first determination result indicates that the target status information is identical to the current status information, it means that the grating structure in the current status can enable the viewer to view good 3D display effect at the current viewpoint, thus there is no need to adjust the status of the grating structure. However, considering that polarization phenomenon easily occurs when the grating element is in a state for a long time period, when the first determination result indicates that the target status information is identical to the current status information, the maintenance time period obtaining circuit may obtain the maintenance time period in which the grating structure maintains the current status, and then the determination circuit determines whether the maintenance time period is greater than the threshold value, to determine whether it is necessary to adjust the status of the grating structure More specifically, the above maintenance time period obtaining circuit may obtain the maintenance time period in which the grating structure maintains the current status in a way that includes: recording a time t1 when the grating element changes its state for the last time, obtaining a current time t0, and calculating a difference between t1 and t0, thereby obtaining the maintenance time period in which the grating structure maintains the current status.

Specifically, the above threshold value may be set according to actual needs, the above second determination result includes two situations. When the second determination result indicates that the maintenance time period is greater than the threshold value, it means that the grating element is in a state for a long time, at this point, the voltage signal applied to the first electrode and the voltage signal applied to the second electrode are exchanged while the grating structure is still in the current status, thereby enabling the viewer to view good 3D display effect at the current viewpoint while preventing polarization of the grating elements, and then enabling the 3D display device to have better stability.

It should be noted, as shown in FIG. 5, the above adjustment circuit may be implemented as a grating driver IC; the recognition circuit and the image information acquiring circuit of the above collector and the data processing circuit may be integrated in the control mainboard 1 of the 3D display device. The control mainboard 1 may send instructions or data to sub-circuits of the various circuits according to I2C protocol. The control mainboard 1 may control the display panel 2 of the 3D display device to display images or play video. The control mainboard 1 may control states of the grating elements of the grating structure 3 in the 3D display device through the grating driver IC. Before the 3D display device works, the 3D display device may be first initialized to set a plurality of parameters including resolution of to-be-collected face images, a quantity of grating elements of the grating unit, I2C corresponding address, position relationships between the grating structure and the camera as well as the display panel, etc.

One embodiment of the present disclosure further provides a computing device that includes a processor, a collector, a memory and a computer program stored in the memory and executable by the processor. When the computer program is executed by the processor, the processor performs the above method for controlling the 3D display device. Specifically, the processor is coupled with the memory, and the process calls the computer program stored on the memory to perform the above method.

More specifically, the processor is configured to control the collector to collect in real time current face image information of a viewer; based on the face image information, calculate at a second frame rate, target status information of the grating structure when the viewer can see a 3D image at a current viewpoint. The processor is further configured to, adjust a status of the grating structure at a third frame rate according to the target status information of the grating structure, where the third frame rate is greater than the second frame rate.

When the processor controls the collector to collect in real time current face image information of the viewer, the processor is specifically configured to control the collector to collect in real time, at a first frame rate, the current face image information of the viewer, where the first frame rate is less than the second frame rate. Further, when the processor controls the collector to collect in real time current face image information of the viewer, the processor is specifically configured to control the collector to collect a face image at a preset resolution; and perform face recognition for the collected face image to obtain a first recognition result. The processor is specifically configured to, when the first recognition result indicates that the face of the viewer is recognized from the collected face image, obtain the current face image information of the viewer according to the collected face image; and, when the first recognition result indicates that the face of the viewer is not recognized from the collected face image, perform delay operation to reduce the frame rate at which the face images are collected. The processor is specifically configured to, when the first recognition result indicates that the face of the viewer is not recognized from the collected face image, perform delay operation to reduce the second frame rate and the third frame rate.

When the processors calculates at the second frame rate, the target status information of the grating structure when the viewer can see the 3D image at a current viewpoint based on the face image information, the processor is further configured to establish a coordinate system in a first extension direction perpendicular to a plane where the display panel is located and a second extension direction parallel to the plane where the display panel is located, and calculate coordinates of the current viewpoint of the viewer at the second frame rate based on the face image information. The processor is further configured to calculate the target status information of the grating structure when the viewer can see the 3D image at the current viewpoint at the second frame rate based on the coordinates of the current viewpoint of the viewer.

When the processor calculates at the second frame rate, the target status information of the grating structure when the viewer can see the 3D image at the current viewpoint based on the face image information, the processor is further configured to calculate at the second frame rate a gating position of each grating unit of the grating structure with the following formula: $m=[(r-x)/k]\% n$ or $m=(x/k)\% n$; where $k=2 L/n$, m represents the grating position, r represents the resolution of the face image, x represents the coordinates of the current viewpoint, k represents a width of the grating element of the grating structure, n represents a quantity of grating elements of the grating unit in the grating structure, and L represents a monocular visual zone width of the viewer.

The processor is further configured to, according to the grating position, search for the target status information of the grating structure in a pre-created database that includes a plurality of pieces of target status information corresponding to a plurality of grating positions in a one-to-one manner.

When the processor adjusts the status of the grating structure at the third frame rate according to the target status information of the grating structure, the processor is further configured to determine whether the target status information of the grating structure is identical to current status information of the grating structure, thereby obtaining a first determination result. The processor is further configured to, when the first determination result indicates that the target status information is different from the current status information, adjust the status of the grating structure at the third frame rate according to the target status information of the grating structure, thereby enabling the viewer to view good 3D display effect at the current viewpoint; and when the first determination result indicates that the target status information is identical to the current status information, obtain a maintenance time period in which the grating structure maintains the current status. The processor is further configured to determine whether the maintenance time period is greater than a threshold value, thereby obtaining a second determination result. The processor is further configured to, when the second determination result indicates that the maintenance time period is greater than the threshold value, exchange a voltage signal applied to the first electrode and a voltage signal applied to the second electrode.

The computing device of one embodiment of the present disclosure can adjust in real time the states of the grating elements according to the current viewpoint of the viewer, thereby enabling the viewer to view good 3D display effect no matter how the viewer's viewpoint changes.

In addition, in the computing device of one embodiment of the present disclosure, by setting the third frame rate being greater than the second frame rate, the rate at which the processor adjusts the status of the grating structure according to the target status information is greater than the rate at which the processor calculates the status of the grating structure. Thus, when the current viewpoint of the viewer is changed, the grating structure can respond quickly to ensure a better real-time performance when the current viewpoint of the viewer is changed.

In one embodiment, the processor may be one processor or a collective term for a plurality of processing elements. For example, the processor may be a CPU or one or more integrated circuits configured to implement the above method for controlling the 3D display device.

The memory may be a volatile memory or a nonvolatile memory, or may include both of the volatile memory and the non-volatile memory. The nonvolatile memory may be a read-only memory (ROM), a programmable ROM (PROM), an erasable PROM (PROM), an erasable PROM (EPROM), an electrically EPROM (EPROM) or a flash memory. The volatile memory may be a random access memory (RAM) which may be used as an external cache. Many forms of RAM are available by way of illustration and not limitation, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM) or a Direct Rambus RAM (DRRAM). The memories described in the present disclosure are intended to include, without being limited to, these and any other suitable types of memory.

One embodiment of the present disclosure further provides a computer readable storage medium that stores a computer program that can be executed by the processor to perform the above method for controlling the 3D display device.

The computer readable storage medium of one embodiment of the present disclosure stores the computer program that can be executed by the processor to perform the above method for controlling the 3D display device. Specific types of the computer readable storage medium may be referred to the above description of the memory in the above-mentioned computer device. The computer program stored in the computer readable storage medium as well as specific steps in which the processor executes the computer program may be referred to the above description of the 3D display device.

It should be understood that, the embodiments described herein can be implemented in hardware, software, firmware, middleware, microcode, or a combination thereof. For hardware implementations, the processing circuit may be implemented in one or more application specific integrated circuits (ASICs), a digital signal processing (DSP), a DSP device (DSPD), a programmable logic device (PLD), a field-programmable gate array (FPGA), a general processor, a controller, a microcontroller, a microprocessor, other electronic components that can perform functions of the present disclose or an combination thereof.

For software implementations, techniques described herein can be implemented by modules (e.g., procedures, functions, and so on) that perform the functions described herein. Software codes can be stored in the memory and executed by the processor. The memory may be implemented in the processor or external to the processor.

The various embodiments in the present disclosure are described in a progressive manner, and each embodiment focuses on differences from other embodiments, and the same similar parts between the various embodiments may be referred to each other.

Those skilled in the art will appreciate that the embodiments of the present disclosure may be provided as a method, device or computer program product. Thus, the embodiments of the present disclosure may take the form of an entirely hardware embodiment, an entirely software embodiment, or a combination of software and hardware aspects. Further, the embodiments of the present disclosure may take the form of a computer program product embodied on one or more computer-usable storage media (including but not limited to a disk storage, a CD-ROM, an optical storage, etc.) having computer usable program codes embodied therein.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although optional embodiments of the present disclosure have been described, those of ordinary skill in the art may make further changes and modifications of the embodiments. Therefore, the appended claims are intended to be interpreted as including the embodiments and the modifications.

It should also be noted that the relationship terminologies such as "first", "second" and the like are only used herein to distinguish one entity or operation from another, rather than necessitate or imply that the actual relationship or order exists between the entities or operations. Furthermore, terms of "include", "comprise" or any other variants are intended to be non-exclusive. Therefore, a process, method, article or device including a plurality of components includes not only the listed components but also other components that are not enumerated, or, also include the components inherent for the process, method, article or device. Without other limitations, the component defined by the statement "comprising (including) one . . . " does not exclude the case that other similar components may exist in the process, method, article or device having the above component.

It should be noted that, those skilled in the art may further appreciate that the various means disclosed herein and algorithm steps described in the exemplary embodiments, may be implemented by electronic hardware, computer software, or a combination thereof. In order to clearly illustrate the interchangeability of hardware and software, the foregoing has generally described functional components and steps of each example. Whether these functions are performed by hardware or software depends upon the particular application and design constraints of the technical solutions. Those skilled in the art may use different methods for each specific application to implement the described functionality, but such implementation should not be considered outside the scope of the present disclosure.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A method for controlling a 3D display device that includes a display panel and an adjustable grating structure, the method comprising:
    collecting in real time current face image information of a viewer;
    based on the current face image information, calculating at a second frame rate, target status information of the adjustable grating structure, wherein the target status information of the adjustable grating structure provides a 3D image for the viewer at a current viewpoint; and
    adjusting a status of the adjustable grating structure at a third frame rate according to the target status information of the adjustable grating structure;
    wherein the third frame rate is greater than the second frame rate;
    wherein based on the current face image information, calculating at the second frame rate, the target status information of the adjustable grating structure, wherein the target status information of the adjustable grating structure provides the 3D image for the viewer at the current viewpoint, includes:
    establishing a coordinate system in a first extension direction perpendicular to a plane where the display panel is located and a second extension direction parallel to the plane where the display panel is located;
    calculating coordinates of the current viewpoint of the viewer at the second frame rate based on the current face image information; and
    based on the coordinates of the current viewpoint of the viewer, calculating at the second frame rate, the target status information of the adjustable grating structure, wherein the target status information of the adjustable grating structure provides the 3D image for the viewer at the current viewpoint;
    wherein based on the coordinates of the current viewpoint of the viewer, calculating at the second frame rate, the target status information of the adjustable grating structure, wherein the target status information of the adjustable grating structure provides the 3D image for the viewer at the current viewpoint, includes:
    calculating a grating position of each grating unit of the adjustable grating structure at the second frame rate with a formula: $m=[(r-x)/k]\% \, n$ or $m=(x/k) \, \% \, n$; wherein $k=2 \, L/n$, m represents the grating position of each grating unit of the adjustable grating structure, r represents a resolution of a face image, x represents the coordinates of the current viewpoint of the viewer, k represents a width of a grating element of the adjustable grating structure, n represents a quantity of grating elements of a grating unit in the adjustable grating structure, and L represents a monocular visual zone width of the viewer, where units of r, x, k and L are pixel unit; and
    according to the grating position of each grating unit of the adjustable grating structure, searching for the target status information of the adjustable grating structure in a database that includes a plurality of pieces of target status information of the adjustable grating structure corresponding to a plurality of grating positions in a one-to-one manner.

2. The method of claim 1, wherein the collecting in real time the current face image information of the viewer includes: collecting in real time, at a first frame rate, the current face image information of the viewer;
    wherein the first frame rate is less than the second frame rate.

3. The method of claim 1, wherein the collecting in real time the current face image information of the viewer includes:
    collecting a face image at a preset resolution;
    obtaining a first recognition result by performing face recognition for the collected face image; and obtaining the current face image information of the viewer according to the collected face image when the first recognition result indicates that a face of the viewer is recognized from the collected face image.

4. The method of claim 3, wherein the collecting in real time the current face image information of the viewer further includes:
reducing a frame rate at which the face image is collected, by performing delay operation, when the first recognition result indicates that the face of the viewer is not recognized from the collected face image.

5. The method of claim 4, wherein when the first recognition result indicates that the face of the viewer is not recognized from the collected face image, the method further includes: reducing the second frame rate and the third frame rate by performing the delay operation.

6. The method of claim 1, wherein the adjusting the status of the adjustable grating structure at the third frame rate according to the target status information of the adjustable grating structure, includes:
determining whether the target status information of the adjustable grating structure is identical to current status information of the adjustable grating structure, thereby obtaining a first determination result;
when the first determination result indicates that the target status information of the adjustable grating structure is different from the current status information of the adjustable grating structure, adjusting the status of the adjustable grating structure at the third frame rate according to the target status information of the adjustable grating structure, thereby providing the 3D image for the viewer at the current viewpoint.

7. The method of claim 6, wherein the adjustable grating structure includes a first electrode and a second electrode, the first electrode and the second electrode generate a driving electric field that drives grating units of the adjustable grating structure to switch between a light transmission state and an opaque state;
the adjusting the status of the adjustable grating structure at the third frame rate according to the target status information of the adjustable grating structure, further includes:
obtaining a maintenance time period in which the adjustable grating structure maintains the current status of the adjustable grating structure, when the first determination result indicates that the target status information of the adjustable grating structure is identical to the current status information of the adjustable grating structure;
determining whether the maintenance time period is greater than a threshold value, thereby obtaining a second determination result; and
exchanging a voltage signal applied to the first electrode and a voltage signal applied to the second electrode, when the second determination result indicates that the maintenance time period is greater than the threshold value.

8. A 3D display device comprising:
a display panel;
an adjustable grating structure;
a collector configured to collect in real time current face image information of a viewer;
a data processing circuit configured to, based on the current face image information, calculate at a second frame rate, target status information of the adjustable grating structure, wherein the target status information of the adjustable grating structure provides a 3D image for the viewer at a current viewpoint; and
a grating adjuster configured to adjust a status of the adjustable grating structure at a third frame rate according to the target status information of the adjustable grating structure;
wherein the third frame rate is greater than the second frame rate;
wherein the data processing circuit includes:
a first data processing sub-circuit configured to establish a coordinate system in a first extension direction perpendicular to a plane where the display panel is located and a second extension direction parallel to the plane where the display panel is located, and calculate coordinates of the current viewpoint of the viewer at the second frame rate based on the current face image information; and
a second data processing sub-circuit configured to, based on the coordinates of the current viewpoint of the viewer, calculate at the second frame rate, the target status information of the adjustable grating structure, wherein the target status information of the adjustable grating structure provides the 3D image for the viewer at the current viewpoint;
wherein the second data processing sub-circuit includes a grating position calculation sub-circuit and a search sub-circuit;
wherein the grating position calculation sub-circuit is configured to calculate at the second frame rate a grating position of each grating unit of the adjustable grating structure with a formula: $m=[(r-x)/k]\% \, n$ or $m=(x/k) \% \, n$; wherein $k=2\,L/n$, m represents the grating position of each grating unit of the adjustable grating structure, r represents a resolution of a face image, x represents the coordinates of the current viewpoint of the viewer, k represents a width of the grating element of the adjustable grating structure, n represents a quantity of grating elements of a grating unit in the adjustable grating structure, and L represents a monocular visual zone width of the viewer, where units of r, x, k and L are pixel unit;
wherein the search sub-circuit is configured to, according to the grating position of each grating unit of the adjustable grating structure, search for the target status information of the adjustable grating structure in a database that includes a plurality of pieces of target status information of the adjustable grating structure corresponding to a plurality of grating positions in a one-to-one manner.

9. The 3D display device of claim 8, wherein the collector is further configured to collect in real time, at a first frame rate, the current face image information of the viewer; and the first frame rate is less than the second frame rate.

10. The 3D display device of claim 8, wherein the collector includes:
a collecting instrument configured to collect a face image at a preset resolution;
a recognition circuit configured to perform face recognition for the collected face image to obtain a first recognition result; and
an image information acquiring circuit configured to, when the first recognition result indicates that a face of the viewer is recognized from the collected face image, obtain the current face image information of the viewer according to the collected face image.

11. The 3D display device of claim 10, wherein the collector further includes: a delay circuit configured to, when the first recognition result indicates that the face of the viewer is not recognized from the collected face image, perform delay operation to reduce a frame rate at which the face image is collected.

12. The 3D display device of claim 11, wherein the delay circuit is further configured to, when the first recognition result indicates that the face of the viewer is not recognized from the collected face image, perform the delay operation to reduce the second frame rate and the third frame rate.

13. The 3D display device of claim 8, wherein the grating adjuster includes a determination circuit and an adjustment circuit;
the determination circuit is configured to determine whether the target status information of the adjustable grating structure is identical to current status information of the adjustable grating structure, thereby obtaining a first determination result; and
the adjustment circuit is configured to, when the first determination result indicates that the target status information of the adjustable grating structure is different from the current status information of the adjustable grating structure, adjust the status of the adjustable grating structure at the third frame rate according to the target status information of the adjustable grating structure, thereby providing the 3D image for the viewer at the current viewpoint.

14. The 3D display device of claim 13, wherein the adjustable grating structure includes a first electrode and a second electrode, the first electrode and the second electrode generate a driving electric field that drives grating units of the adjustable grating structure to switch between a light transmission state and an opaque state;
the grating adjuster further includes: a maintenance time period obtaining circuit configured to, when the first determination result indicates that the target status information of the adjustable grating structure is identical to the current status information of the adjustable grating structure, obtain a maintenance time period in which the adjustable grating structure maintains the current status of the adjustable grating structure;
the determination circuit is further configured to determine whether the maintenance time period is greater than a threshold value, thereby obtaining a second determination result; and
the adjustment circuit is further configured to, when the second determination result indicates that the maintenance time period is greater than the threshold value, exchange a voltage signal applied to the first electrode and a voltage signal applied to the second electrode.

15. A computing device comprising: a processor, a memory and a computer program stored in the memory; wherein when the computer program is executed by the processor, the processor performs the method of claim 1.

* * * * *